United States Patent
Low et al.

[15] 3,662,744
[45] May 16, 1972

[54] METHOD FOR MEASURING CUTANEOUS SENSORY PERCEPTION

[72] Inventors: George M. Low, Acting Administrator of the National Aeronautics and Space Administration in respect to an invention of; Robert W. Richardson, 2325 Hayes Road, Norristown, Pa. 19403; David B. Wright, 2617 Wayland Road, Berwyn, Pa. 19312

[22] Filed: Dec. 2, 1970

[21] Appl. No.: 94,347

[52] U.S. Cl. .........................................128/2 N
[51] Int. Cl. ..........................................A61b 10/00
[58] Field of Search............................128/2; 73/78

[56] References Cited

UNITED STATES PATENTS

| | | | |
|---|---|---|---|
| 3,058,225 | 10/1962 | Ward | 128/2 X |
| 2,704,539 | 3/1955 | Fisher | 128/2 |
| 1,842,323 | 1/1932 | Gluzek | 128/2 |
| 2,422,520 | 6/1947 | Bartley | 128/2 |
| 3,074,395 | 1/1963 | Kevorkian | 128/2 |
| 3,115,773 | 12/1963 | Kruger | 73/78 X |
| 3,153,338 | 10/1964 | Kleesattel | 73/78 X |

FOREIGN PATENTS OR APPLICATIONS 251,759 7/1970 U.S.S.R. ...........................128/2

OTHER PUBLICATIONS

NASA Tech. Brief, 66–10647, Dec. 1966.

*Primary Examiner*—Richard A. Gaudet
*Assistant Examiner*—Kyle L. Howell
*Attorney*—Edward K. Fein, Marvin F. Matthews and John R. Manning

[57] ABSTRACT

A method for detecting and measuring cutaneous sensory perception. The method utilizes an instrument comprises an elongate tubular housing having a sleeve member extending axially from an end thereof. Mounted on the other end of the tubular housing is a vernier counter adjustment, the operating mechanism of which is disposed internally of the housing. Telescopically positioned within the sleeve is a thin wire-like member or monofilament stimulating element. One end of the monofilament stimulating element extends from the sleeve while the other end is mechanically coupled to the internal operating mechanism of the vernier counter adjustment.

2 Claims, 4 Drawing Figures

PATENTED MAY 16 1972

3,662,744

Robert W. Richardson
David B. Wright
INVENTOR

BY
Edward K. Fein
ATTORNEY

METHOD FOR MEASURING CUTANEOUS SENSORY PERCEPTION

ORIGIN OF THE INVENTION

The invention described herein was made in the performance of work under a NASA Contract and is subject to the provisions of Section 305 of the National Aeronautics and Space Act of 1958, Public Law 85-568 (72 Stat. 435; 42 U.S.C. 2457).

BACKGROUND OF THE INVENTION

The present invention relates to an improved method for detecting and measuring cutaneous sensory perception. More particularly the present invention is directed to a method for determining and measuring the cutaneous sensory threshold which characterizes different persons.

Certain neurological and other medical examinations and procedures require the location and delineation of areas of analgesia, or absence of pain and touch sensitivity, as well as areas of hypothesia, that is reduced pain or touch sensitivity, of the skin of a person. These procedures are frequently necessary in cases of special examinations for the treatment of neurological disorders as well as in general medical checkups and also as a diagnostic aid in the determination of various diseases.

A number of deficiencies have characterized the instruments heretofore utilized in attempting to accurately detect and measure human cutaneous perception. Most such devices have included the use of a sharp pin or a plurality of pins of differing sharpness and cross sectional areas. The pin or pins have been brought into contact with the skin by the medical examiner while observing the response of the patient. Because of the different muscular coordination by different examiners, the resulting pin strikes lack any of the requisite uniformity and it has therefore been exceedingly difficult for even the individual examiner to contact the skin with a consistent degree of pressure. More obvious of course is the substantial inability for different examiners to attain a consistent and reliable measurement of cutaneous sensory perception on a given individual. Therefore, in certain cases the differences in cutaneous sensory perception reported by the individual or patient may be due not to the causes determined by the health condition of the patient but by the variance in the intensity of the pin strikes made by the examiner. Such variances in the muscular coordination between examiners produces obviously unreliable results for either diagnostic or treatment purposes.

SUMMARY OF THE INVENTION

The instant invention is believed to obviate all of the aforementioned objections and disadvantages characterizing prior art methods for measuring cutaneous perception. For example, the invention is inherently capable of consistently applying a regular and determinable pressure to the skin of the individual. Moreover, the application of such pressure is independent of the relative condition of muscular coordination of the examiner. Still further, the improved method of the invention provides for perfectly reliable results. It is of relatively simple construction, inexpensive to manufacture, and can be effectively operated in research or clinical practice by any technician. Briefly, the invention comprises a method utilizing a flexible but stiff wire or monofilament stimulating element which is telescopically enclosed in a tubular housing. Affixed within the housing and operatively coupled to the stimulating element is a screwdrive mechanism which is in turn coupled to a vernier counter adjustment on the exterior of the housing. Observation of the vernier counter adjustment at the point of sensory perception by the individual indicates an absolute value for cutaneous response. All of the features and advantages set forth above characterize the structure and operation of this instrument.

In addition, numerous others will become apparent upon a reading of the following detailed description, claims, and drawings in which like numerals denote like parts in the several views and wherein:

DETAILED DESCRIPTION

Figure 1:
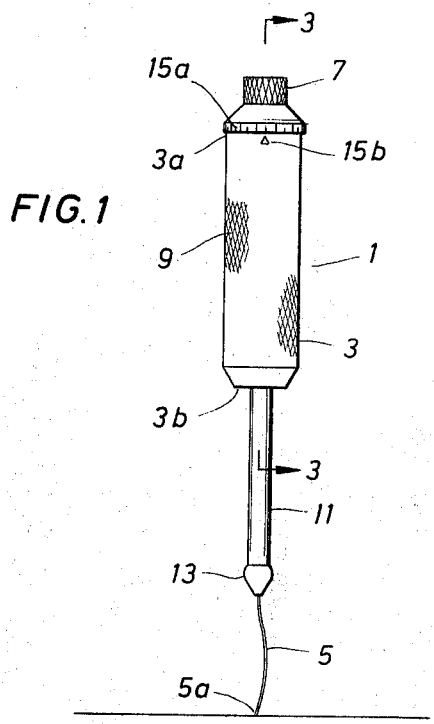
FIG. 1 illustrates the primary components of a preferred embodiment of the invention and in which the monofilament stimulating element is in a relatively flexible position.
Figure 2:
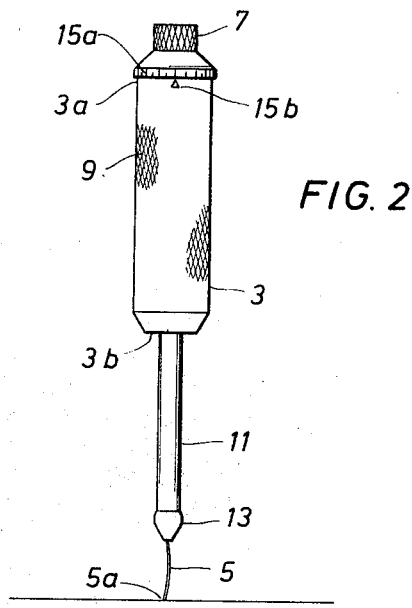
FIG. 2 illustrates the embodiment of FIG. 1 but with the monofilament stimulating element in a relatively rigid position.
Figure 3:
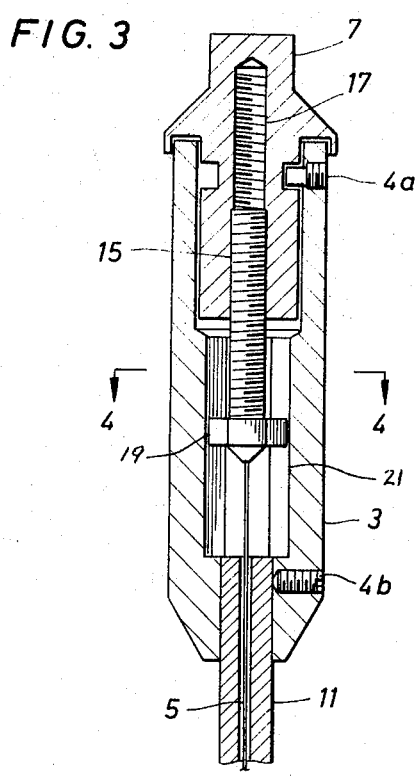
FIG. 3 illustrates a cross-sectional view along the plane 3—3 of FIG. 1 showing the internal drive mechanism for the monofilament stimulating element.

With reference now to FIG. 1 there is shown the improved Aesthesiometer instrument 1 which consists essentially of the tubular housing 3, a monofilament stimulating element 5, and the vernier counter adjustment 7. The tubular housing 3 is shaped as an elongate body and is characterized by a knurled surface 9 so as to facilitate the gripping or holding thereof by the examiner. Disposed on the upper end 3a of the housing 3 and forming a closure for such end is the aforementioned vernier counter adjustment 7 which serves as the means for manually retracting or projecting the monofilament stimulating element 5. The housing may be fixed to the counter adjustment by a set screw 4a, (see FIG. 3). Extending from the lower end 3b of housing 3 and connected thereto, such as by another set screw 4b, is the sleeve member 11 in which the stimulating element is adapted to move. The sleeve member 11 serves to reinforce and guide the stimulating element 5 whenever the latter is moved therewithin. The sleeve member functions in much the same manner therefore as the internal tubular barrel of a mechanical pencil. In FIG. 1 the monofilament stimulating element 5, which may be made of a nylon wire or the like, is shown in extended position and, as might then be imagined, is relatively flexible when brought into contact with a resisting surface. A cap 13, having a bore therethrough, serves as a terminal point for the bending of the element 5. Therefore the element 5 will tend to bow along that portion of its length where it is not reinforced by the sleeve member 11 or cap 13. Thus it will be evident that a relatively small application of force on an extended portion of stimulating element will result in a deflection that is greater than that which would be realized on a shorter or retracted portion of the stimulating member. Examination of FIG. 2 shows the monofilament stimulating element 5 in such retracted position. Here, due to the rigidity imparted to element 5 by its intimate contact with sleeve member 11 and cap 13 it may be easily visualized that substantially less deflection will occur upon application of a given force. If the tip 5a of element 5 of the instrument shown in both FIGS. 1 and 2 were placed in near contacting relation with the skin of a patient and subsequently a given force was axially applied downwardly along the element, such force being the same in each instrument, the pressure exerted by the retracted element of FIG. 2 on the skin will be predictably greater than the extended element in the instrument of FIG. 1. In this way the relative cutaneous sensory perception of an individual cannot only be accurately detected but it may also be measured, the latter through the use of the vernier counter adjustment 7.

Figure 4:
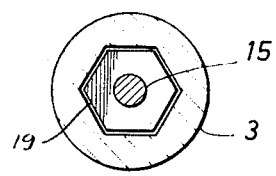
FIG. 4 is a cross sectional view along the plane 4—4 of FIG. 3.

The vernier counter adjustment 7 is coupled to the stimulating element 5 by means of a threaded bore which has therein a cooperating screw drive mechanism 15. The mechanism 15 is fixedly connected at its lower end to the hexagonal head 19 which is of such size as to enable movement thereof axially within elongate cavity 21. The element 5 is affixed to the bottom of screw drive mechanism 15. In this manner rotational movement of the vernier counter adjustment 7 is transmitted into axial movement of element 5. However, it will be recognized that the vernier counter adjustment could be mechanically coupled to the monofilament stimulating element 5 in another appropriate manner. The vernier counter adjustment itself is characterized by a clocklike face 15a which is manually rotated in order to align a given number on the face with a reference index mark 15b at the upper end 3a of tubular housing 3. FIG. 4 illustrates a top view of the screw drive mechanism which effectuates the operational relationship of the vernier adjustment 15 and stimulating element 5. Rotational movement of the vernier counter adjustment in a clockwise direction results in protraction of the stimulating element from within sleeve member 11 while counter-clockwise movement causes telescoping retraction of the element into the sleeve member. The extended length of the stimulating element 5 may thus be readily correlated to the dial setting in the clocklike face 15a of counter adjustment 15.

In operation the stimulating element is brought into contact with the skin of the subject and advanced until a slight flexure is noted in the element. If the individual makes no response or indicates no feeling, the element is shortened so as to make it more rigid and contact is again made with the subject. Once the pressure of the element is evidenced by the subject, the dial setting is noted and the figure thereon opposite the index mark 15b is recorded for future reference.

It is understood that the form of the invention herein shown and described is to be taken as a preferred example of the same, and that various changes in the shape, size, and mechanical arrangement of the parts may be resorted to without departing from the spirit of the invention and the scope of the appended claims.

That which is claimed and desired to be secured by United States Letters Patent is:

1. A method for detecting and measuring the threshold of cutaneous sensory perception using an elongate, flexibly resilient stimulating element telescopically supported within a housing including the steps of:
   1. Extending the telescoping stimulating element outward from the housing a predetermined distance;
   2. Contacting the skin of the subject with the free end of stimulating element, applying pressure until a slight flexure occurs in the element;
   3. Retracting the stimulating element a predetermined increment into the housing thereby making the stimulating element more rigid;
   4. Repeatedly performing steps (2) and (3) in sequence until the subject responds to or indicates a particular cutaneous sensitivity;
   5. Determining the threshold of cutaneous sensory perception as a function of the length of that part of the stimulating element extending from the housing.

2. The method as described in claim 1 further including the step of:
   measuring the length of that part of the stimulating element extending from the housing.

* * * * *